United States Patent
Lee et al.

(10) Patent No.: US 9,185,636 B2
(45) Date of Patent: Nov. 10, 2015

(54) APPARATUS AND METHOD FOR AUTOMATICALLY SEARCHING FOR LOW-POWER BASE STATION SUPPORTING ACCESS OF REGISTERED USER IN MOBILE COMMUNICATION SYSTEM

(75) Inventors: Ok-Seon Lee, Suwon-si (KR); Jong-Hyung Kwun, Seongnam-si (KR); Jung-Hoon Cheon, Suwon-si (KR); Kyeong-In Jeong, Hwaseong-si (KR); Sung-Oh Kwon, Seoul (KR); Hwa-Jin Cha, Seongnam-si (KR); Neung-Hyung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1162 days.

(21) Appl. No.: 12/586,120

(22) Filed: Sep. 17, 2009

(65) Prior Publication Data

US 2010/0069069 A1    Mar. 18, 2010

(30) Foreign Application Priority Data

Sep. 18, 2008    (KR) ........................ 10-2008-0091566

(51) Int. Cl.
*H04W 4/00*    (2009.01)
*H04W 48/16*   (2009.01)
*H04W 48/02*   (2009.01)
*H04W 84/04*   (2009.01)

(52) U.S. Cl.
CPC .............. *H04W 48/16* (2013.01); *H04W 48/02* (2013.01); *H04W 84/045* (2013.01)

(58) Field of Classification Search
CPC .................................................. H04W 80/04

USPC ...................................... 370/328, 310.2, 400
See application file for complete search history.

(56) References Cited

U.S. PATENT DOCUMENTS

| 7,139,571 | B1 | 11/2006 | Ishikawa et al. |
|---|---|---|---|
| 2009/0047968 | A1* | 2/2009 | Gunnarsson et al. ......... 455/446 |
| 2009/0156208 | A1* | 6/2009 | Vesterinen et al. ........ 455/435.1 |
| 2009/0238117 | A1* | 9/2009 | Somasundaram et al. .... 370/328 |

(Continued)

FOREIGN PATENT DOCUMENTS

| JP | 2007-235593 A | 9/2007 |
|---|---|---|
| KR | 10-2001-0015324 A | 2/2001 |
| KR | 10-2008-0067512 | 7/2008 |

OTHER PUBLICATIONS

Notice of Preliminary Rejection dated Jul. 24, 2014 in connection with Korean Patent application No. 10-2008-0091566; 9 pages.

(Continued)

*Primary Examiner* — Hassan Kizou
*Assistant Examiner* — Abdelnabi Musa

(57) ABSTRACT

An apparatus and method for automatically searching for a low-power Base Station (BS) supporting access of a registered user in a mobile communication system includes a method of performing automatic search on a Closed Subscriber Group (CSG) cell by a User Equipment (UE). The method includes determining by the UE whether automatic search needs to be performed on the CSG cell. The method also includes, if it is determined that automatic search does not need to be performed on the CSG cell, turning off by the UE a CSG cell automatic search function of the UE by emptying a first white list including CSG Identifiers of accessible CSG cells.

10 Claims, 9 Drawing Sheets

(56) References Cited

U.S. PATENT DOCUMENTS

| | | |
|---|---|---|
| 2010/0075670 A1* | 3/2010 | Wu .............................. 455/434 |
| 2010/0110945 A1* | 5/2010 | Koskela et al. ............... 370/310 |
| 2011/0028143 A1* | 2/2011 | Johansson et al. ......... 455/422.1 |
| 2014/0038610 A1 | 2/2014 | Jeong et al. |
| 2014/0045495 A1* | 2/2014 | Deshpande et al. .......... 455/434 |

OTHER PUBLICATIONS

Notice of Patent Grant dated Nov. 20, 2014 in connection with Korean Patent Application No. KR 10-2008-0091566 ; 7 pages.

* cited by examiner

WHITE LIST OF UE

APPARATUS AND METHOD FOR AUTOMATICALLY SEARCHING FOR LOW-POWER BASE STATION SUPPORTING ACCESS OF REGISTERED USER IN MOBILE COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Sep. 18, 2008 and assigned Serial No. 10-2008-0091566, the entire disclosure of which is hereby incorporated by reference.

TECHNICAL FIELD OF THE INVENTION

The present invention relates to an apparatus and method for automatically searching for a low-power Base Station (BS) supporting access of a registered user in a mobile communication system. More particularly, the present invention relates to an apparatus and method for preventing a Closed Subscriber Group (CSG) cell from being unnecessarily automatically searched for by a User Equipment (UE) by using a white list.

BACKGROUND OF THE INVENTION

In recent years, it is considered to install more low-power Base Stations (BSs) (e.g., femto BSs) to compensate for a macro BS in a wireless communication system. The femto BS is a home BS or a Small Office Home Office (SOHO) BS that is installed in a region other than a service area of the macro BS or that is installed in a region where service quality is low due to weak signal strength. The femto BS provides a User Equipment (UE) with a portable Internet service similarly to the macro BS. Characteristics of the femto BS include low power, small capacity, low price, and the like, which are optimized for a small indoor environment (e.g., home or SOHO). Therefore, the femto BS has to interoperate with the macro BS, and a legacy UE has to receive a service by switching between the femto BS and the macro BS. That is, it is necessary to achieve a handover between the macro BS and the femto BS according to a wireless environment so that the UE may receive an improved service.

A femto cell is classified into a cell accessible by all UEs and a cell accessible by only an allowed UE. The cell accessible by only the allowed UE is referred to as a Closed Subscriber Group (CSG) cell. In an environment where the CSG cell coexists with a macro cell, the UE has to automatically search for a CSG cell located nearby without the aid of a network.

A method of performing automatic search on a CSG cell by a UE will be described below. First, the UE uses a normal gap pattern of the UE to verify a gap duration in which communication is not performed, and scans a neighbor cell during the verified gap duration. Herein, the gap duration is a scanning duration for searching for the neighbor cell. The UE receives a reference symbol from the neighbor cell during the gap duration, and obtains a Physical Cell IDentifier (PCID) of the neighbor cell by using the received reference symbol. Thereafter, the UE reports the obtained PCID of the neighbor cell to a serving macro BS by using a measurement report message. In this case, the serving macro BS allocates a long gap to the UE by using a gap allocation message with respect to a neighbor CSG cell of which radio wave strength greater than or equal to a specific threshold, and allows the UE to be able to receive a System Information Block (SIB) of the neighbor CSG cell during the long gap duration. Herein, the SIB includes a General Cell Identifier (GCID), which is a unique cell IDentifier (ID) of the neighbor cell and a CSG ID, which is a unique CSG cell ID. Therefore, the UE may obtain the CSG ID of the neighbor CSG cell. The UE compares the obtained CSG ID with a CSG ID of a white list stored in a Universal Subscriber Identity Module (USIM) of the UE, and thus may recognize whether the CSG cell is accessible CSG cell. The white list is a list of CSG cells accessible by the UE. Thereafter, the UE reports an accessible CSG cell to the serving macro BS by using the measurement report message, and the serving macro BS determines whether the UE may be handed over to the CSG cell according to the reported accessible CSG cell.

The method of performing automatic search on the CSG cell by the UE has the following problems. First, the CSG cell is searched for even if the UE does not support a CSG function, and the UE supporting the CSG function continuously searches for the CSG cell even in a region where the CSG cell does not exist, which results in battery waste of the UE. When using an asynchronous system, an SIB broadcast time of a neighbor CSG cell cannot be known, and thus the UE is assigned with a long gap having a length equal to or longer than an SIB broadcast period so as to allow the UE to obtain a CSG ID of the neighbor CSG cell during a corresponding long gap duration. In this case, data communication with respect to the UE is disconnected during the long gap duration, thereby causing a problem of user throughput deterioration in the UE. Further, another problem arises in that a user has to receive an SIB even in an active state. Furthermore, according to a 'best cell principle' of the conventional $3^{rd}$ Generation Partnership Project (3GPP) system, a problem arises in that, when a discovered cell is superior to a current serving cell in terms of signal strength, or the like, even if the current cell receives a service without errors, the signal strength, or the like, are measured and reported so as to attempt handover or cell reselection. If this principle is also applied to a femto cell environment, there is a need to provide a method of occasionally turning off a neighbor cell search function of the UE.

SUMMARY OF THE INVENTION

To address the above-discussed deficiencies of the prior art, it is a primary aspect of the present invention is to solve at least the above-mentioned problems and/or disadvantages and to provide at least the advantages described below. Accordingly, an aspect of the present invention is to provide an apparatus and method for automatically searching for a low-power BS supporting access of a registered user in a mobile communication system.

Another aspect of the present invention is to provide an apparatus and method whereby a white list is updated by considering a condition of a User Equipment (UE) in a $3^{rd}$ Generation Partnership Project (3GPP) system and the updated white list is used to prevent a Closed Subscriber Group (CSG) cell from being unnecessarily automatically searched for by the UE.

Another aspect of the present invention is to provide an apparatus and method whereby the number of automatic search attempts unnecessarily performed on a CSG cell by a UE in a 3GPP system is decreased, thereby improving a user throughput by reducing battery waste of the UE and unnecessary gap allocation.

Another aspect of the present invention is to provide an apparatus and method whereby a white list of a UE not supporting a CSG function in a 3GPP system is emptied so that the UE does not perform automatic search on a CSG cell.

Another aspect of the present invention is to provide an apparatus and method whereby, when a handover to a CSG cell is not desirable since a UE supporting, a CSG function in a 3GPP system moves to a region where no CSG cell is accessible by the UE, or since the UE moves with a high speed, a white list of the UE is emptied so that the UE does not perform automatic search on the CSG cell.

Another aspect of the present invention is to provide an apparatus and method whereby, when a UE supporting a CSG function in a 3GPP system moves to a new region by performing handover or cell reselection or when a white list of the UE is empty in a situation where the UE is switched from a high speed UE to a low speed UE, a presence or absence of a CSG cell accessible by the UE is determined, and if the CSG cell is present, the white list is recovered to perform automatic search on the CSG cell.

Another aspect of the present invention is to provide an apparatus and method for inserting all or some of CSG IDs of CSG cells to which a UE is registered (e.g., a CSG ID of a CSG cell neighboring to the UE among the CSG cells to which the UE is registered) into a white list when the white list is updated in a 3GPP system.

Another aspect of the present invention is to provide an apparatus and method for updating a white list of a UE by the UE itself or by a network in a 3GPP system.

Another aspect of the present invention is to provide an apparatus and method for managing a white list of a UE in a 3GPP system by classifying the white list into an management white list (i.e., an allowed CSG ID list) including CSG IDs of all CSG cells to which the UE is registered and a search white list (i.e., an accessible CSG ID list) including a CSG ID of a CSG cell currently accessible by the UE.

In accordance with an aspect of the present invention, a method of performing automatic search on a CSG cell by a UE is provided. The method includes determining, by the UE, whether automatic search needs to be performed on the CSG cell, and if it is determined that automatic search does not need to be performed on the CSG cell, turning off, by the UE, a CSG cell automatic search function of the UE by emptying a first white list including CSG IDs of accessible CSG cells.

In accordance with another aspect of the present invention, an apparatus for performing automatic search on a CSG cell by a UE is provided. The apparatus includes a CSG automatic search unit for determining whether automatic search needs to be performed on the CSG cell, and for turning off an CSG cell automatic search function of the UE by emptying a first white list if it is determined that automatic search does not need to be performed on the CSG cell, and the first white list including CSG IDs of accessible CSG cells of the UE.

In accordance with another aspect of the present invention, a method of updating a white list of a UE by a network is provided. The method includes obtaining by the network at least one information selected from a CSG ID of a newly installed CSG BS and a UE ID of a UE registered to the newly installed CSG BS, if the UE enters into the coverage of a macro BS, obtaining by the network at least one information selected from a UE ID of the entering UE and a CSG ID identifying an accessible CSG BS and included in the white list managed by the entering UE, determining by the network whether a CSG BS accessible by the entering UE exists near the macro BS on the basis of the obtained information, and transmitting by the network a white list update command to the entering UE according to the determination result.

In accordance with another aspect of the present invention, a system is provided. The system includes a network for transmitting a white list update command to a UE, wherein the network obtains at east one information selected from a CSG ID of a newly installed CSG BS and a UE ID of a UE registered to the newly installed CSG BS, wherein, if the UE enters into the coverage of a macro BS, the network obtains at least one information selected from a UE ID of the entering UE and a CSG ID identifying an accessible CSG BS and included in a white list managed by the entering UE, wherein the network determines whether a CSG BS accessible by the entering UE exists near the macro BS on the basis of the obtained information, and wherein the network transmits a white list update command to the entering UE according to the determining result, and the UE for updating the white list according to the white list update command received from the network.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention described below relates to an apparatus and method whereby a white list is updated by considering a condition of a UE in a 3GPP system and the updated white list is used to prevent a Closed Subscriber Group (CSG) cell from being unnecessarily automatically searched for by the UE.

Figure 1:
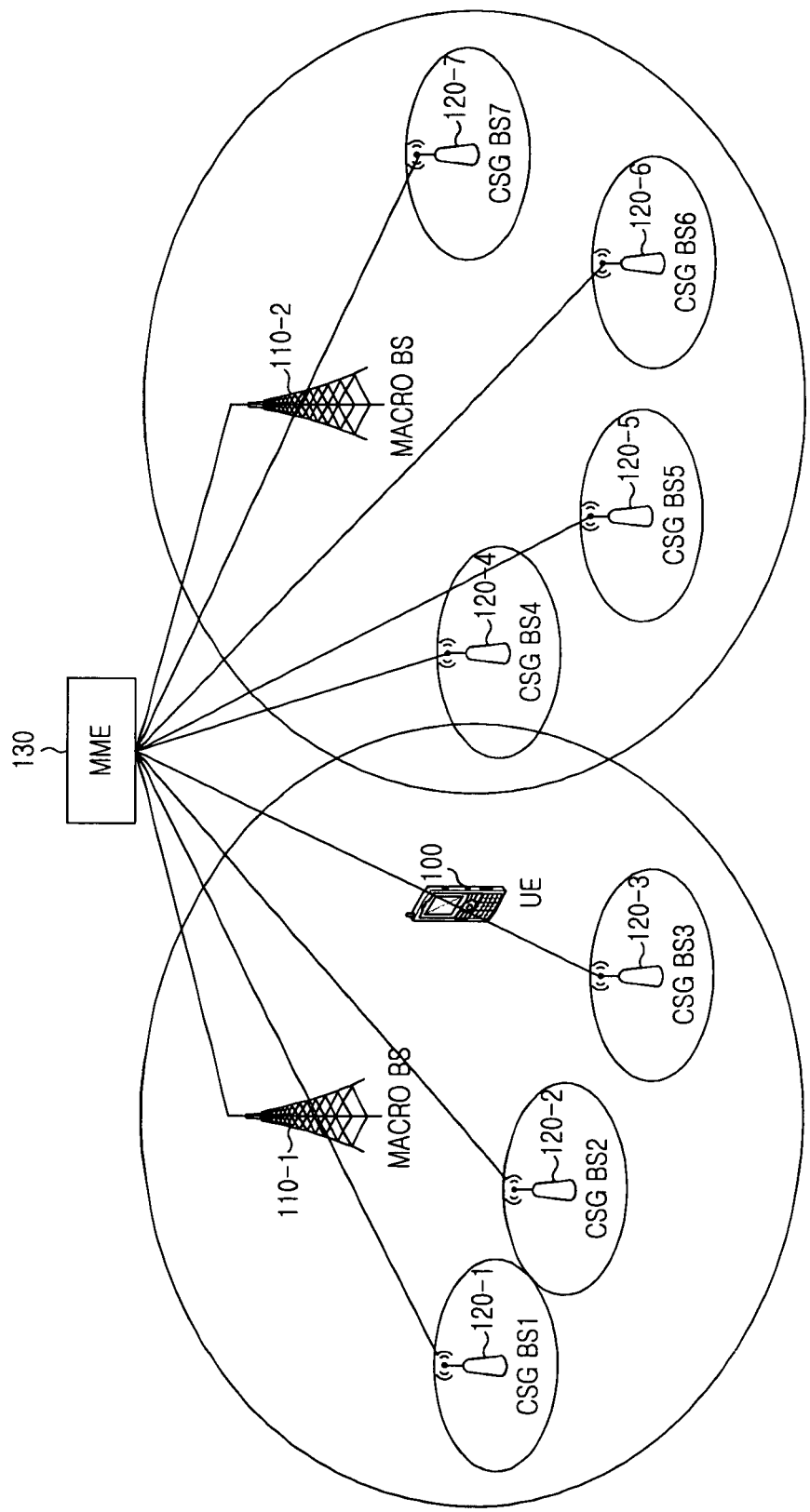
FIG. 1 illustrates an environment where a Closed Subscriber Group (CSG) cell coexists with a macro cell according to an exemplary embodiment of the present invention.

FIG. 1 illustrates an environment where a CSG cell coexists with a macro cell according to an exemplary embodiment of the present invention.

Referring to FIG. 1, macro Base Stations (BSs) 110-1 and 110-2 cover a wide region (i.e., a macro cell) including a region (i.e., a CSG cell) of one or more CSG BSs 120-1 to 120-3 and 120-4 to 120-7, and provide services to a UE 100. The UE 100 may be classified into a UE supporting a CSG function and a UE not supporting the CSG function. The CSG BSs 120-1 to 120-7 provide services to the UE 100 when the UE 100 that supports the CSG function and that is registered to the CSG BSs 120-1 to 120-7 enters a service area. A Mobility Management Entity (MME) 130 communicates with the macro BSs 110-1 to 110-2 and the CSG BSs 120-1 to 120-7 through an S1 interface, and manages mobility of the UE 100 in a unit greater than that of the BSs.

Although not shown, the UE supporting the CSG function according to the embodiment of the present invention includes a CSG automatic search unit and a white list. The CSG automatic search unit determines whether automatic search needs to be performed on a CSG cell. If it is determined that automatic search does not need to be performed on the CSG cell, the CSG automatic search unit turns off a CSG cell automatic search function of the UE by emptying the white list. If it is determined that automatic search needs to be performed on the CSG cell, the CSG automatic search unit turns on the CSG cell automatic search function of the UE by recovering the white list. The white list stores CSG IDentifier (IDs) of CSG cells accessible by the UE.

Figure 2:
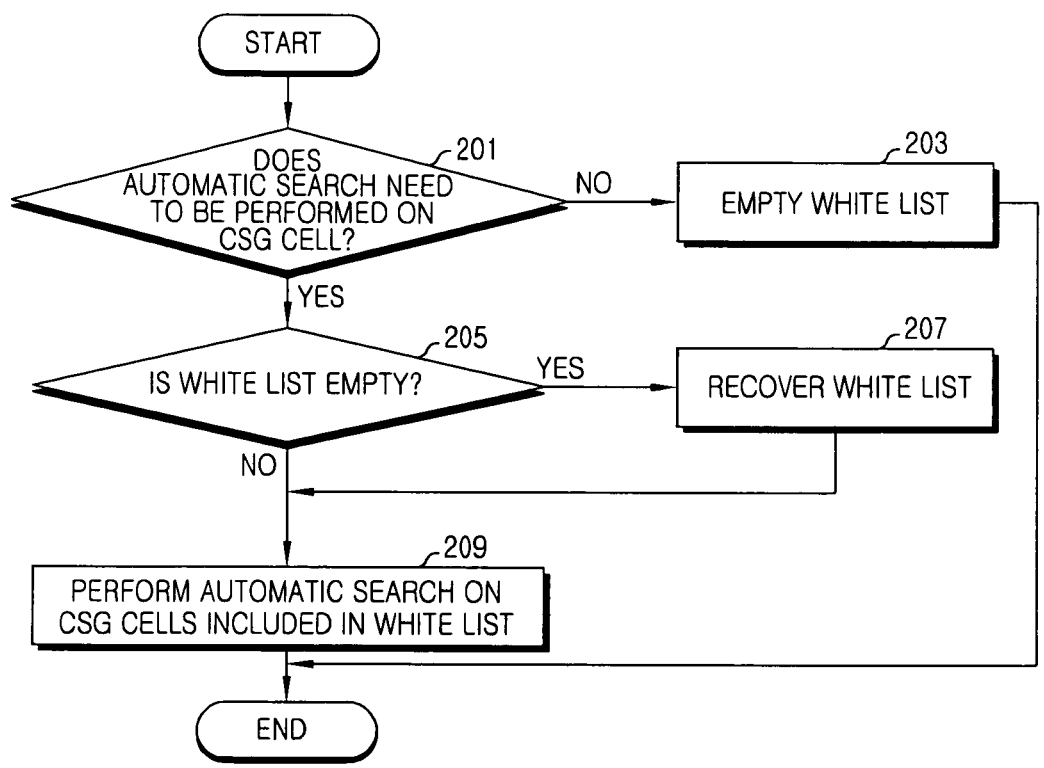
FIG. 2 illustrates a flowchart for a method of updating a white list by a UE by considering a condition of the UE in a mobile communication system according to a first embodiment of the present invention.

FIG. 2 illustrates a flowchart for a method of updating a white list by a UE by considering a condition of the UE in a mobile communication system according to a first embodiment of the present invention.

Referring to FIG. 2, a UE determines whether automatic search needs to be performed on a CSG cell in step 201. For example, if the UE does not support a CSG function, or even if the UE supports the CSG function, if an accessible CSG cell does not exist nearby or the UE is a high speed UE, the UE may determine that automatic search does not need to be performed on the CSG cell. Alternatively, if the UE supports the CSG function and if an accessible CSG cell exists nearby or the UE is switched from the high speed UE to a low speed UE, the UE may determine that automatic search needs to be performed on the CSG cell.

Whether the accessible CSG cell exists nearby may be determined by using a fingerprint or the like. A macro cell periodically broadcasts information such as a Public Land Mobile Network (PLMN) ID, a Location Area Code (LAC)/Routing Area Code (RAC)/Tracking Area Code (TAC), a macro cell ID, and the like. Therefore, the UE receives the broadcast information in a location of a CSG cell to which the UE is registered and stores the received information as the fingerprint. That is, the fingerprint is information on a neighbor environment of the CSG cell to which the UE is registered, and is information remembered by the UE. It is presumed herein that there is almost no possibility that the fingerprint overlaps in at least one PLMN. Therefore, the UE may compare current broadcast information with the fingerprint and thus determine whether an accessible CSG cell exists nearby. For example, if the current broadcast information and the fingerprint have the same information, the UE may determine that the accessible CSG cell exists nearby. If there is a change in the neighbor environment of the CSG cell to which the UE is registered, a network may transmit a fingerprint change indication message to the UE so that the UE may change its fingerprint according to the change.

If it is determined in step 201 that automatic search does not need to be performed on the CSG cell, the UE turns off its CSG cell automatic search function by emptying the white list in step 203. When the white list of the UE is emptied, the UE does not perform automatic search on the CSG cell even if there is no extra instruction. Thus, the number of automatic search attempts unnecessarily performed on the CSG cell may be reduced.

Alternatively, if it is determined in step 201 that an automatic search needs to be performed on the CSG cell, the UE determines whether the while list is empty in step 205. If it is determined in step 205 that the white list is not empty, the UE turns on its CSG cell automatic search function by recovering the white list in step 207, and performs automatic search on CSG cells included in the recovered white list in step 209. When the white list is recovered, the UE may recover the white list by inserting all CSG IDs of CSG cells to which the UE is registered into the white list. In a case where the UE knows a CSG ID of a CSG cell currently accessible by the UE, the UE can recover the white list by inserting only the CSG ID of the currently accessible CSG cell into the white list among the CSG cells to which the UE is registered. In this case, the CSG ID of the CSG cell currently accessible by the UE may be known by using the fingerprint.

Alternatively, if it is determined in step 205 that the white list is not empty, proceeding to step 209, the UE performs automatic search on the CSG cells included in the current white list.

Thereafter, the procedure of FIG. 2 ends.

Figure 3:
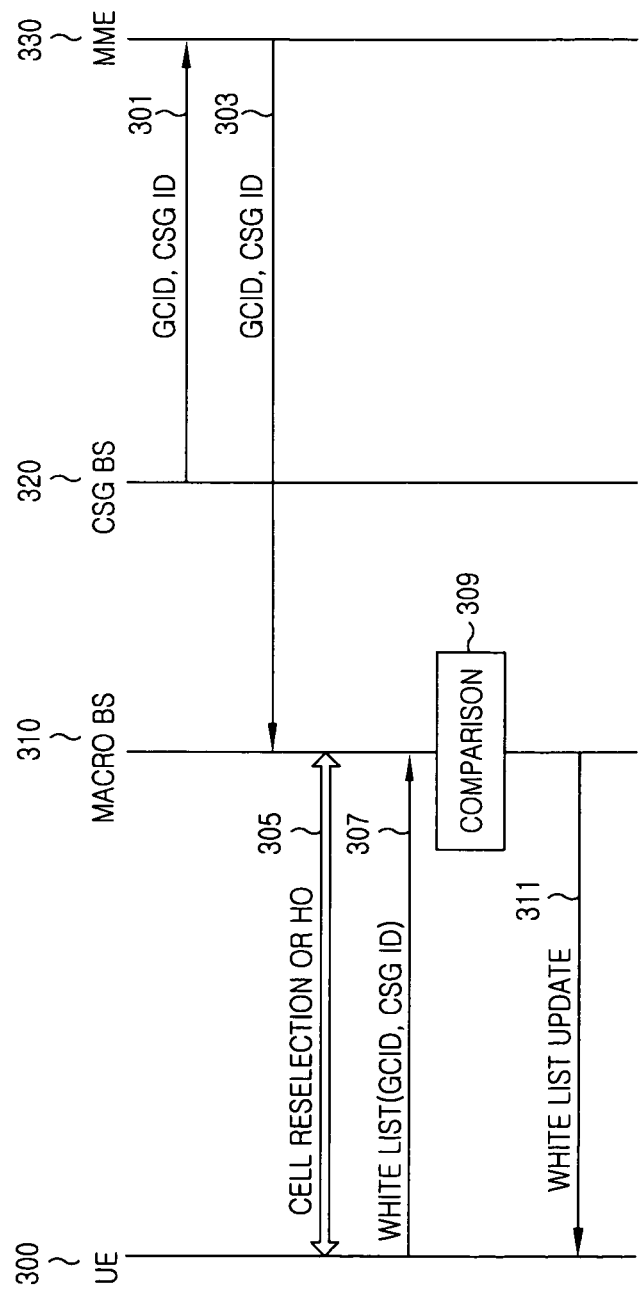
FIG. 3 illustrates a flowchart for a method of updating a white list of a UE by a macro BS when the macro BS communicates with a CSG BS through an S1 interface in a mobile communication system according to a second embodiment of the present invention.

FIG. 3 illustrates a flowchart for a method of updating a white list of a UE by a macro BS when the macro BS communicates with a CSG BS through an S1 interface in a mobile communication system according to an embodiment of the present invention.

Referring to FIG. 3, whenever a new CSG BS 320 is installed, the CSG BS 320 transmits a General Cell Identifier (GCID) and CSG ID to an MME 330 (step 301). In this case, the MME 330 transmits the GCID and CSG ID of the CSG BS 320 to a macro BS 310 located in a region where the CSG BS 320 is installed (step 303). In this manner, the macro BS 310 may collect GCIDs and CSG IDs of neighbor CSG BSs 320.

Cell reselection or Handover (HO) is performed (step 305), and thus a UE 300 enters into the coverage of the macro BS 310. The macro BS 310 receives the white list from the UE 300 (step 307). The white list includes a GCID and a CSG ID which are managed by the UE 300. The macro BS 310 can receive the CSG ID managed by the UE 300 from the MME 330 or a BS that previously provided a service to the UE 300. In this case, a range of a neighbor CSG cell of the macro BS 310 may be limited to a range in which the UE 300 located within the coverage of the macro BS 310 may enter by performing HO or cell reselection process.

Thereafter, the macro BS 310 compares the previously collected CSG ID of the neighbor CSG BS 320 with a CSG ID managed by the UE 300, and determines whether a CSG cell accessible by the UE 300 exists near the macro BS 310 (step 309). According to the determination result, the macro BS 310 transmits a white list update command to the UE 300 (step 311). Herein, the white list update command transmitted by the macro BS 310 to the UE 300 includes a command for emptying or recovering the white list according to a situation. That is, if the CSG cell accessible by the UE 300 does not exist near the macro BS 310, the macro BS 310 instructs the UE 300 to empty the white list. If the CSG cell accessible by the UE 300 exists near the macro BS 310 but the white list of the UE 300 is empty, the macro BS 310 instructs the UE 300 to recover the white list. If the CSG cell accessible by the UE 300 exists near the macro BS 310 and the white list of the UE 300 is not empty, the macro BS 310 does not have to transmit the white list update command to the UE 300. Thus, the UE 300 performs automatic search on the CSG cell on the basis of the current white list.

Figure 4:
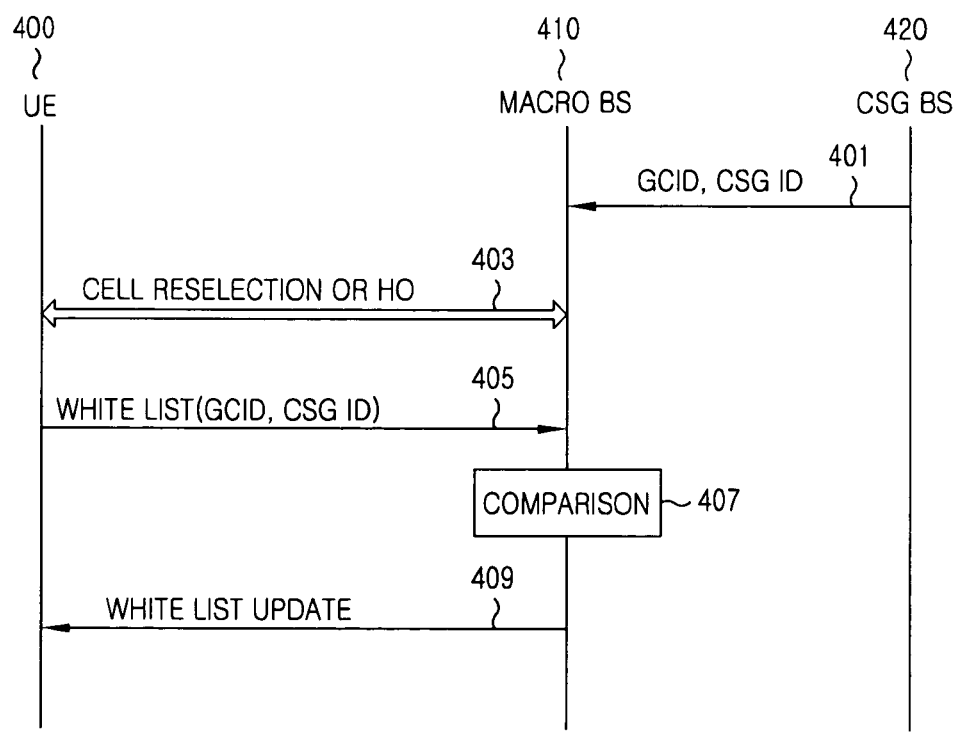
FIG. 4 illustrates a flowchart for a method of updating a white list of a UE by a macro BS when the macro BS directly communicates with a CSG BS in a mobile communication system according to a third embodiment of the present invention.

FIG. 4 illustrates a flowchart for a method of updating a white list of a UE by a macro BS when the macro BS directly communicates with a CSG BS in a mobile communication system according to an embodiment of the present invention.

Referring to FIG. 4, whenever a new CSG BS 420 is installed, the CSG BS 420 transmits its GCID and CSG ID to a macro BS 410 located in a region where the CSG BS 420 is installed (step 401). In this manner, the macro BS 410 can collect GCIDs and CSG IDs of neighbor CSG BSs 420. Steps 403 to 409 are identical to steps 305 to 311 of FIG. 3, and thus repetitive descriptions will be omitted.

Figure 5:
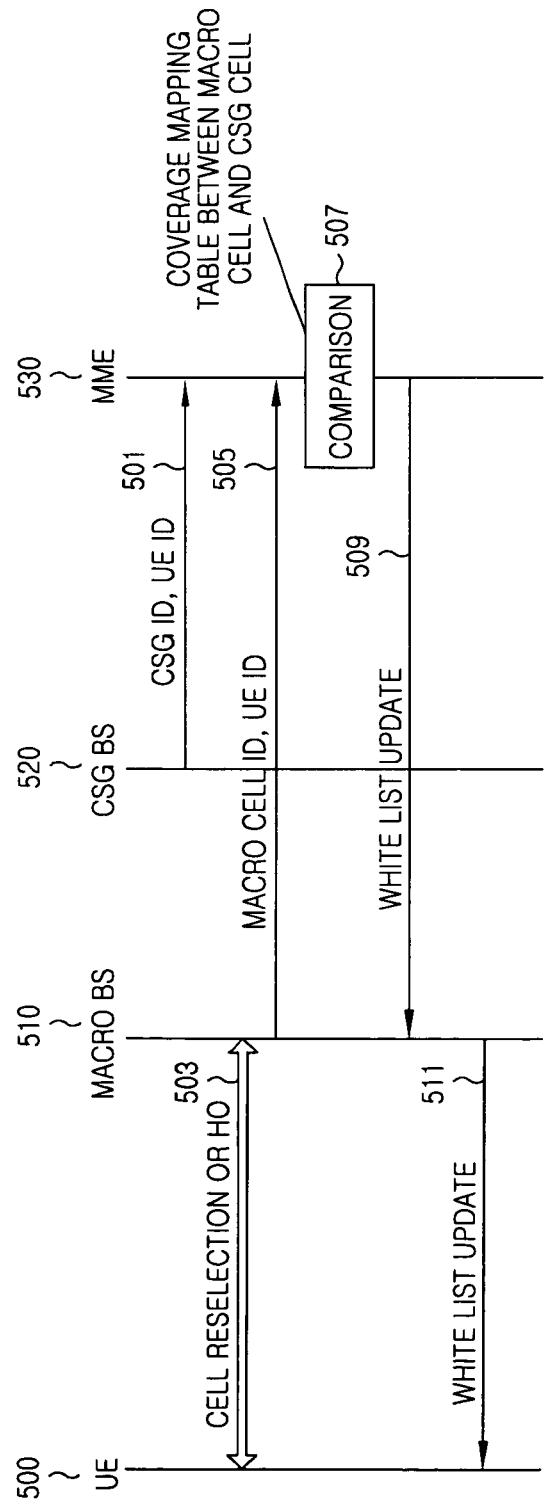
FIG. 5 illustrates a flowchart for a method of updating a white list of a UE by a Mobility Management Entity (MME) when a macro BS communicates with a CSG BS through an S1 interface in a mobile communication system according to a fourth embodiment of the present invention.

FIG. 5 illustrates a flowchart for a method of updating a white list of a UE by an MME when a macro BS communicates with a CSG BS through an S1 interface in a mobile communication system according to an embodiment of the present invention.

Referring to FIG. 5, whenever a new CSG BS 520 is installed, the CSG BS 520 transmits to an MME 530 a CSG ID of the CSG BS 520 and an ID of a UE registered to the CSG BS 520 (step 501). In this manner, the MME 530 can collect CSG IDs of neighbor CSG BSs 520 and UE IDs registered to the neighbor CSG BSs 520s.

Cell reselection or HO is performed (step 503), and thus a UE 500 enters into the coverage of a macro BS 510. The MME 530 receives a macro cell ID and an ID of the UE 500 from the macro BS 510 (step 505). Herein, the MME 530 manages a coverage mapping table between a macro cell and a CSG cell, and can search for a CSG ID mapped to the macro cell ID by using the mapping table. Therefore, the MME 530 compares information collected by the neighbor CSG BS 520 and the macro BS 510 on the basis of the mapping table, that is, determines whether a UE accessed to the macro cell is identical to a UE registered to the CSG cell mapped to the macro cell, and thus determines whether a CSG cell accessible by the UE 500 exists near the macro BS 510 (step 507).

Thereafter, the MME 530 transmits a white list update command for the UE 500 to the macro BS 510 according to the determination result of the MME 530 (step 509). The macro BS 510 transmits the white list update command to the UE 500 (step 511).

Figure 6:
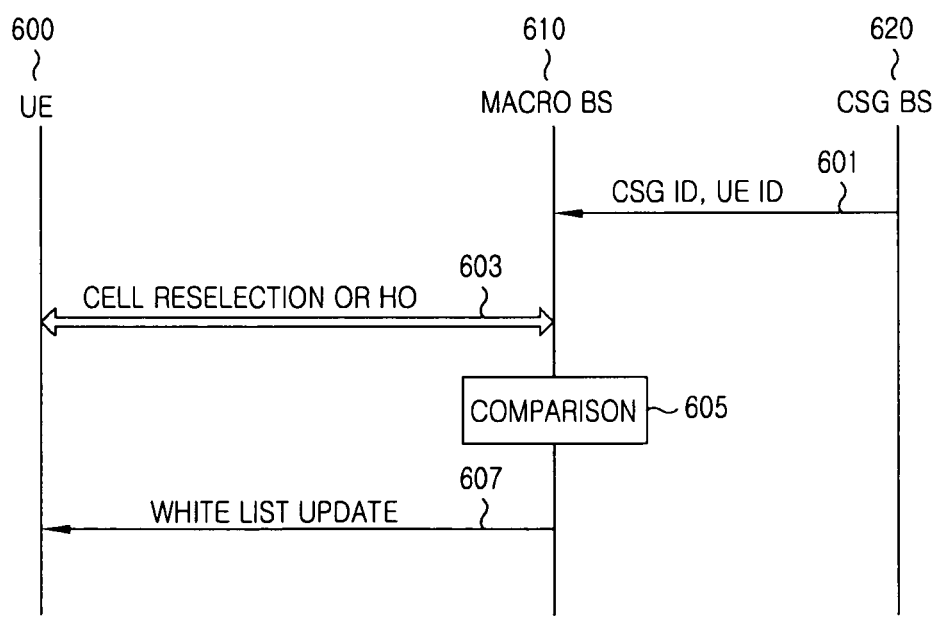
FIG. 6 illustrates a flowchart for a method of updating a white list of a UE by a macro BS when the macro BS directly communicates with a CSG BS in a mobile communication system according to a fifth embodiment of the present invention.

FIG. 6 illustrates a flowchart for a method of updating a white list of a UE by a macro BS when the macro BS directly communicates with a CSG BS in a mobile communication system according to an embodiment of the present invention.

Referring to FIG. 6, whenever a new CSG BS 620 is installed, the CSG BS 620 transmits its CSG ID and an ID of a UE registered to the CSG BS 620 to a macro BS 610 located in a region where the CSG BS 620 is installed (step 601). In this manner, the macro BS 610 may collect CSG IDs of neighbor CSG BSs 620 and UE IDs registered to the neighbor CSG BSs 620.

Cell reselection or HO is performed (step 603), and thus, a UE 600 enters into the coverage of the macro BS 610. Whenever the UE 600 entering into the coverage is detected, the macro BS 610 compares the collected UE ID registered to the neighbor CSG BS 620 with an ID of the UE 600 entering into the coverage, and thus determines whether a CSG cell accessible by the UE 600 exists nearby (step 605). Thereafter, according to the determination result, the macro BS 610 transmits a white list update command to the UE 600 (step 607).

Figure 7:
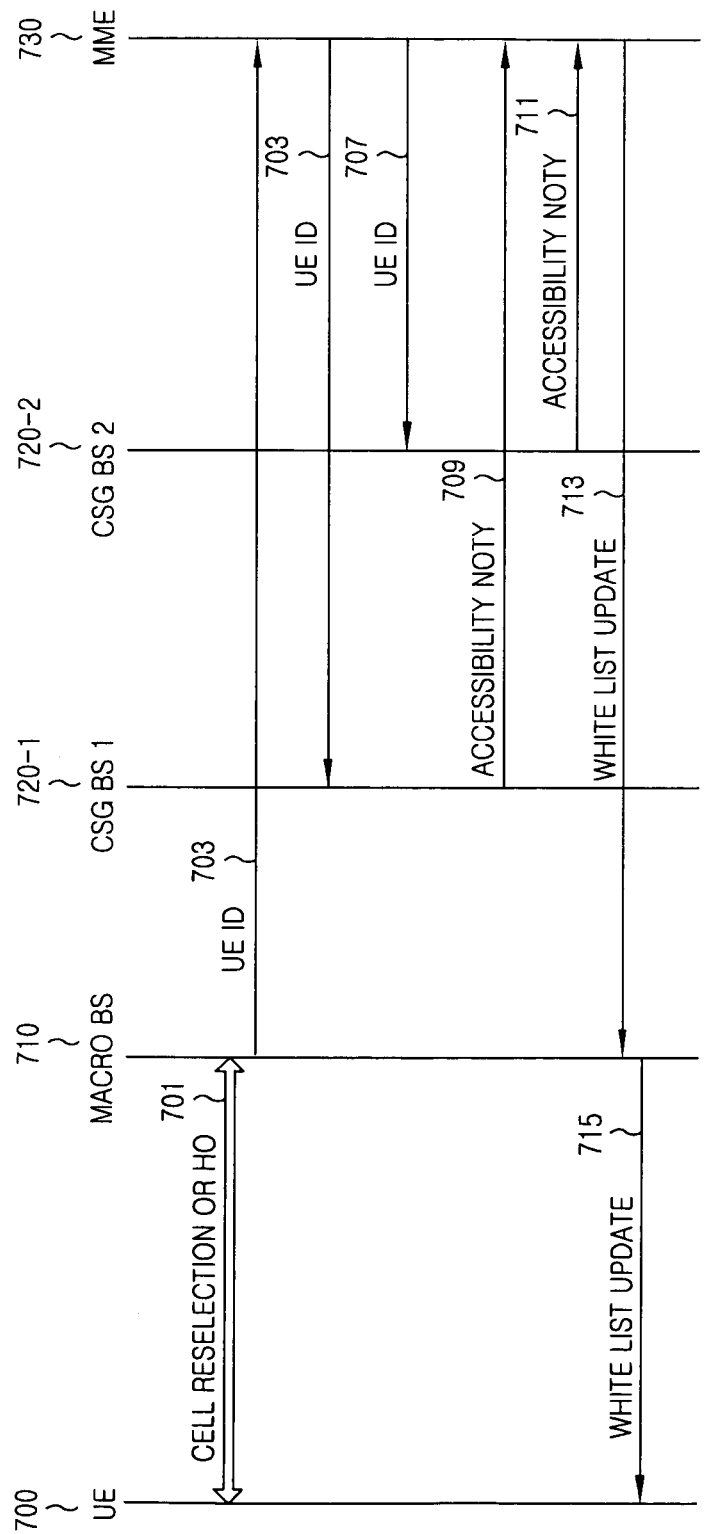
FIG. 7 illustrates a flowchart for a method of updating a white list of a UE by an MME when a macro BS communicates with a CSG BS through an S1 interface in a mobile communication system according to a sixth embodiment of the present invention.

FIG. 7 illustrates a flowchart for a method of updating a white list of a UE by an MME when a macro BS communicates with a CSG BS through an S1 interface in a mobile communication system according to an embodiment of the present invention.

Referring to FIG. 7, cell reselection or HO is performed (step 701), and thus a UE 700 enters into the coverage of a macro BS 710. Whenever the UE 700 entering into the coverage is detected, the macro BS 710 transmits an ID of the UE 700 to an MME 730 (step 703). In this case, the MME 730 transmits the received UE ID to CSG BSs 720-1 and 720-2 mapped to the macro BS 710 (steps 705 and 707). Each of the CSG BSs 720-1 and 720-2 determines whether the UE 700 is a UE registered to them by using the UE ID, and transmits the determination result to the MME 730 (steps 709 and 711). In this case, the MME 730 determines whether a CSG cell accessible by the UE 700 exists nearby by collecting the determination result received from each of the CSG BSs 720-1 and 720-2, and according to the determination result, the MME 730 transmits a white list update command for the UE 700 to the macro BS 710 (step 713). The macro BS 710 transmits the white list update command to the UE 700 (step 715).

Figure 8:
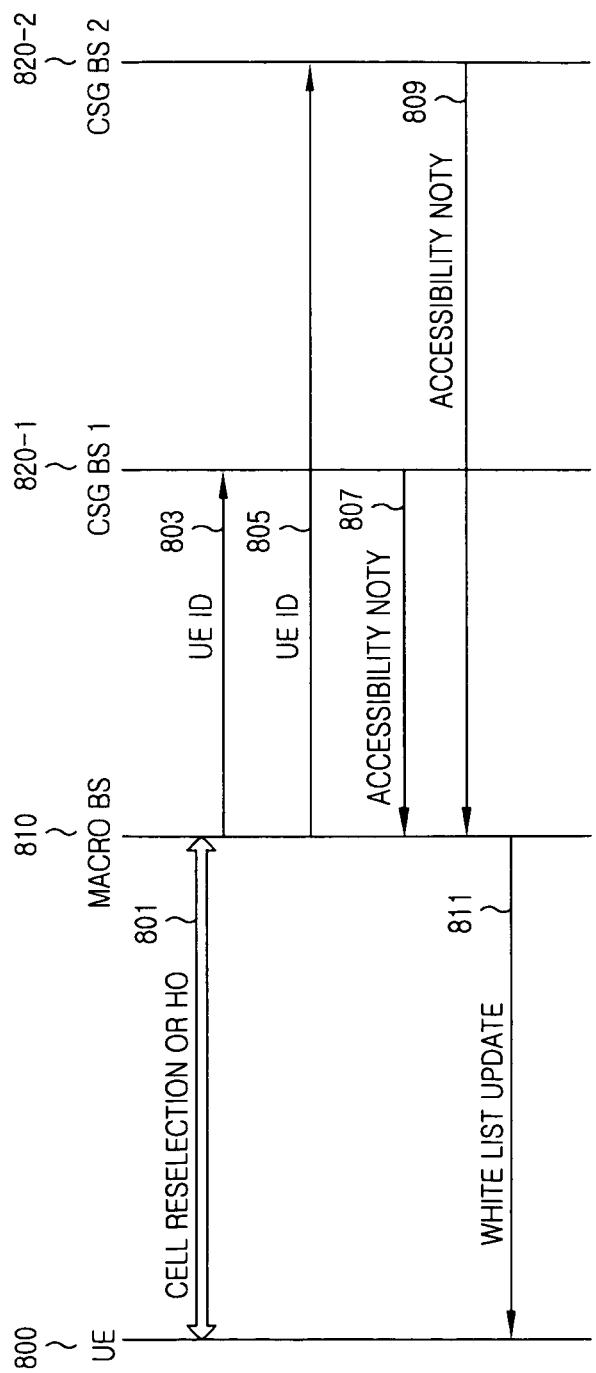
FIG. 8 illustrates a flowchart for a method of updating a white list of a UE by a macro BS when the macro BS directly communicates with a CSG BS in a mobile communication system according to a seventh embodiment of the present invention.

FIG. 8 illustrates a flowchart for a method of updating a white list of a UE by a macro BS when the macro BS directly communicates with a CSG BS in a mobile communication system according to an embodiment of the present invention.

Referring to FIG. 8, cell reselection or HO is performed (step 801), and thus a UE 800 enters into the coverage of a macro BS 810. Whenever the UE 800 entering into the coverage is detected, the macro BS 810 transmits an ID of the UE 800 to CSG BSs 820-1 and 820-2 mapped to the macro BS 810 (steps 803 and 805). Each of the CSG BSs 820-1 and 820-2 determines whether the UE 800 is a UE registered to them by using the UE ID, and transmits the determination result to the macro BS 810 (steps 807 and 809). In this case, the macro BS 810 determines whether a CSG cell accessible by the UE 800 exists nearby by collecting the determination result received from each of the CSG BSs 820-1 and 820-2, and according to the determination result, the macro BS 810 transmits a white list update command for the UE 800 (step 811).

In the method described in the aforementioned embodiment of the present invention, the CSG cell automatic search function is turned off by emptying the white list of the UE when automatic search does not need to be performed on the CSG cell; and the white list of the UE is received from the macro cell, the MME, or the CSG cell when automatic search needs to be performed on the CSG cell. However, this method has a problem of signaling overhead and latency increase. Accordingly, the present invention proposes a method of managing the white list in a dual manner. In this method, two white lists are configured in the UE. The two white lists are a management white list (hereinafter, referred to as an 'allowed CSG ID list') which includes CSG IDs of all CSG cells to which the UE is registered (hereinafter, referred to as an 'allowed CSG ID) and a search white list (hereinafter, referred to as an 'accessible CSG ID list') which includes a CSG ID of a CSG cell currently accessible by the UE (hereinafter, referred to as an 'accessible CSG ID). The allowed CSG ID list is updated when the UE is registered to a new CSG cell, and thus, a new CSG ID is obtained; or when the CSG cell to which the UE is registered is removed; or when the CSG cell to which the UE previously was registered is deleted, and thus the CSG ID is deleted.

The white list update proposed in the present invention implies updating of the accessible CSG ID list. That is, if the UE does not support a CSG function, or even if the UE supports the CSG function, if an accessible CSG cell does not exist nearby or the UE is a high speed UE, the UE determines that automatic search does not need to be performed on the CSG cell, and thus turns off the CSG cell automatic search function of the UE by emptying the white list. Alternatively, if the UE supports the CSG function and if an accessible CSG cell exists nearby or the UE is switched from the high speed UE to a low speed UE, the UE may determine that automatic search needs to be performed on the CSG cell, and verifies the accessible CSG ID list. In this case, if the accessible CSG ID list is empty, the UE turns on its CSG cell automatic search function by recovering the accessible CSG ID list. The accessible CSG ID list is recovered by entirely or partially copying the allowed CSG ID list. For example, if the UE knows a CSG ID of a currently accessible CSG cell of the UE, the UE can recover the accessible CSG ID list by copying only a currently accessible CSG ID included in the allowed CSG ID list.

Figure 9:
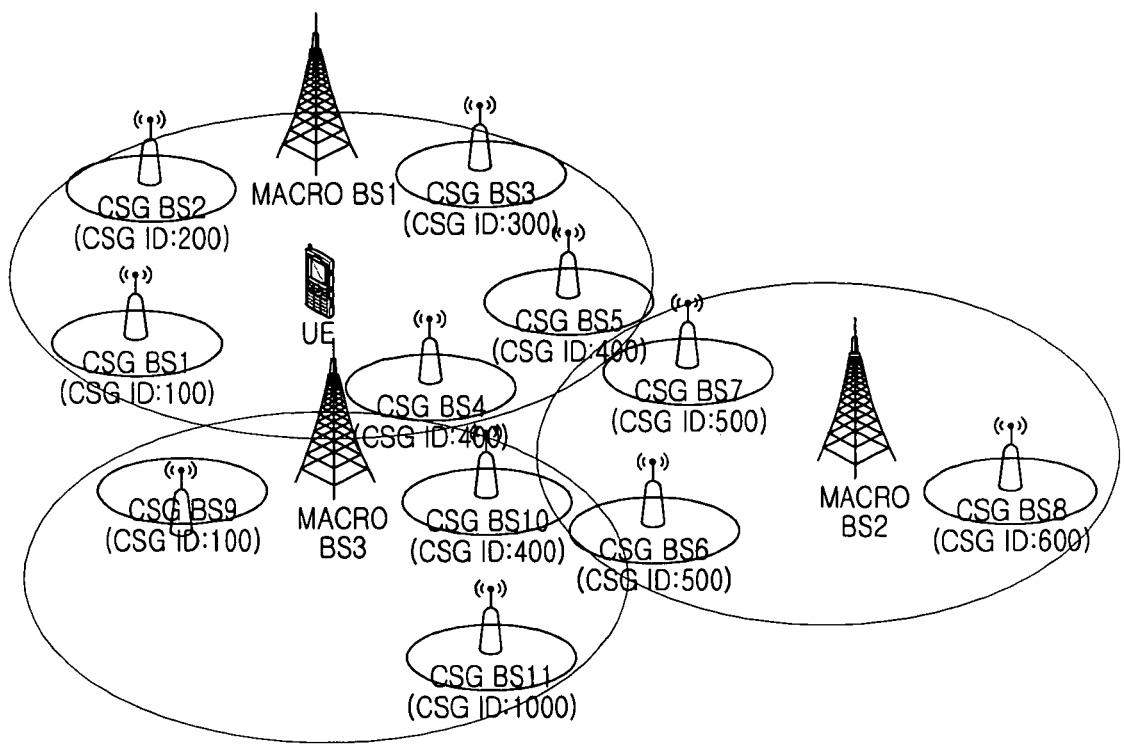
FIG. 9 illustrates a method of managing a white list in a dual manner according to an exemplary embodiment of the present invention.
Figure 9:
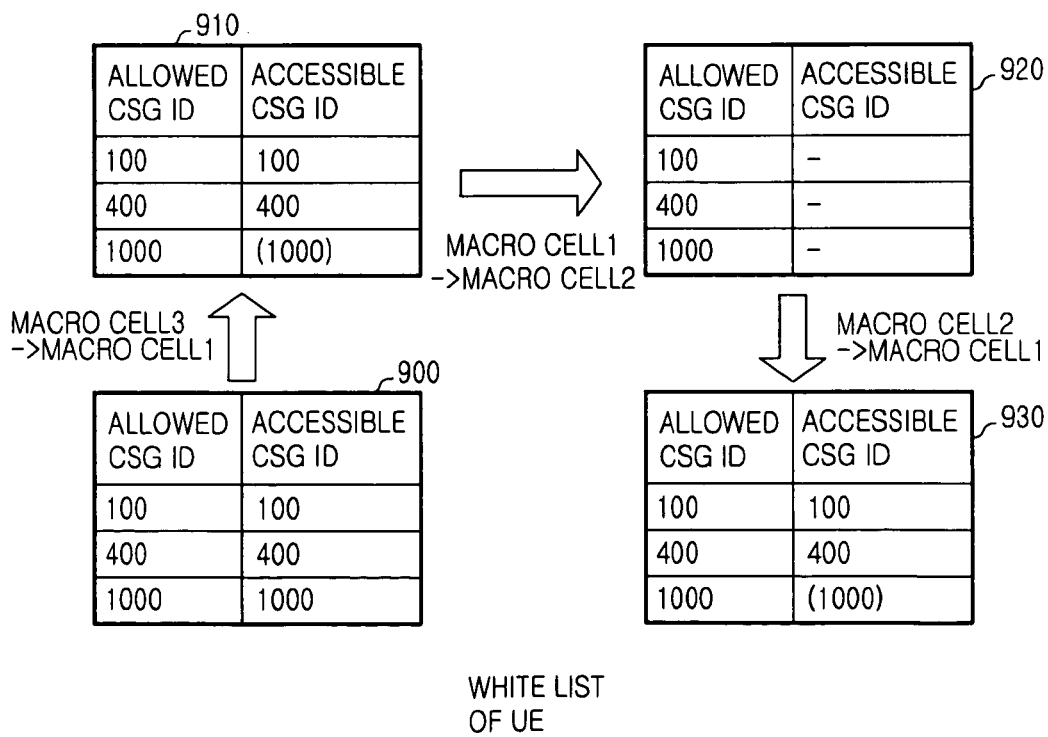

Herein, a method of managing a white list in a dual manner will be described by taking an example of FIG. 9 according to an embodiment of the present invention. It is assumed that a macro cell 3 supports CSG cells having CSG IDs 100, 400, and 1000, and a UE for receiving a service from a macro BS 3 of the macro cell 3 is registered to the CSG cells having the CSG IDs 100, 400, and 1000. It is also assumed that a macro cell 1 supports only CSG cells having CSG IDs 100 and 400 among CSG cells to which the UE is registered, and a macro cell 2 does not support any CSG cell among the CSG cells to which the UE is registered. In this case, a white list 900 of the UE for receiving the service from the macro BS 3 of the macro cell 3 includes the CSG IDs 100, 400, and 1000 of all of the CSG cells to which the UE is registered. An accessible CSG ID list includes the CSG IDs 100, 400, and 1000 by entirely copying the allowed CSG ID list.

If the UE enters into the macro cell 1 from the macro cell 3 afterwards, the UE may determine that accessible CSG cells exist nearby by using fingerprint or the like, and thus may determine that automatic search needs to be performed on the CSG cells. By using the white list 900 of the macro cell 3 before the entering into the macro cell 1, the UE may determine that a previous accessible CSG ID list is not empty. In this case, regarding a white list 910 of a UE for receiving a service from a macro BS 1 of the macro cell 1, the UE maintains an allowed CSG ID list and an accessible CSG ID list which are used in the macro cell 3 before the entering into the cell 1, and performs automatic search on CSG cells included in the accessible CSG ID list. In addition, if the UE knows CSG IDs of currently accessible CSG cells of the UE (i.e., CSG IDs 100 and 400), the UE can delete the remaining CSG ID 1000 other than the CSG IDs 100 and 400 of the currently accessible CSG cells from the accessible CSG ID list.

If the UE enters into the macro cell 2 from the macro cell 1 afterwards, the UE can determine that accessible CSG cells do not exist nearby by using fingerprint or the like, and thus can determine that automatic search does not need to be performed on the CSG cells. In this case, regarding a white list 920 of a UE for receiving a service from a macro BS 2 of the macro cell 2, the UE empties the accessible CSG ID list while maintaining a previous allowed CSG ID list. Accordingly, the UE does not unnecessarily perform automatic search on the CSG cells.

If the UE re-enters into the macro cell 1 from the macro cell 2 afterwards, the UE can determine that accessible CSG cells exist nearby by using fingerprint or the lime, and thus can determine that automatic search needs to be performed on the CSG cells. By using the white list 920 of the macro cell 2 before the entering into the macro cell 1, the UE can determine that a previously accessible CSG ID list is empty. In this case, regarding a white list 930 of a UE for receiving a service from the macro BS 1 of the macro cell 1, the UE recovers the accessible CSG ID list by entirely copying the allowed CSG ID list while maintaining the allowed CSG ID list used in the macro cell 2 before the entering into the macro cell 1, and performs automatic search on CSG cells included in the recovered accessible CSG ID list. In addition, if the UE knows CSG IDs of currently accessible CSG cells (i.e., CSG IDs 100 and 400), the UE can delete the remaining CSG ID 1000 other than the CSG IDs 100 and 400 of the currently accessible CSG cells from the recovered accessible CSG ID list.

Meanwhile, as a method of updating a white list of a UE by a network according to the present invention, although embodiments have been described wherein the white list is updated by one of network entities, such as a macro BS, an MME, a newly installed CSG BS, and the like, alternate embodiments can be used. For example, the white list of the UE also can be updated by other network entities, such as, a Serving GPRS Support Node (SGSN), a Mobile Switching Center (MSC), an Operations & Maintenance (O&M), an Access Control Router (ACR), and the like.

As described above, the present invention provides a method of performing automatic search on a CSG cell by a UE by using a white list in a 3GPP system, and thus has an advantage in that the number of automatic search attempts performed on the CSG cell by the UE may be decreased.

Accordingly, battery waste of the UE and unnecessary gap allocation may be reduced, thereby improving a user throughput.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to perform an automatic search on a Closed Subscriber Group (CSG) cell by a User Equipment (UE), the method comprising:
    determining, by the UE, whether the automatic search needs to be performed on the CSG cell;
    when the automatic search does not need to be performed on the CSG cell, turning off, by the UE, a CSG cell automatic search function of the UE by emptying a first white list including CSG IDentifiers (IDs) of accessible CSG cells;
    when the automatic search needs to be performed on the CSG cell, determining, by the UE, whether the first white list is empty; and
    when the first white list is empty, turning on, by the UE, the CSG cell automatic search function of the UE by recovering the first white list through a second white list including at least one CSG ID of at least one CSG cell to which the UE is registered.

2. The method of claim 1, wherein, in the when recovering the first white list, the second white list is used so that the UE copies the at least one CSG ID included in the second white list and inserts the copied CSG ID into the first white list.

3. The method of claim 1, wherein, when recovering the first white list, the second white list is used so that the UE copies CSG IDs of currently accessible CSG cells among the at least one CSG ID included in the second white list and inserts the copied CSG IDs into the first white list.

4. The method of claim 1, wherein determining whether the automatic search needs to be performed on the CSG cell comprises:
    determining, by the UE, that the automatic search does not need to be performed on the CSG cell when the UE does not support a CSG function, or when the UE supports the CSG function, when an accessible CSG cell does not exist nearby or the UE is a high speed UE; and
    determining, by the UE, that the automatic search needs to be performed on the CSG cell when the UE supports the CSG function and when the accessible CSG cell exists nearby or the UE is switched from the high speed UE to a low speed UE.

5. The method of claim 4, wherein determining whether the automatic search needs to be performed on the CSG cell comprises:
    when a pre-stored fingerprint and current broadcast information have the same information, determining, by the UE, that the accessible CSG cell exists nearby; and
    when the pre-stored fingerprint and the current broadcast information do not have the same information, determining, by the UE, that the accessible CSG cell does not exist nearby.

6. An apparatus configured to perform an automatic search on a Closed Subscriber Group (CSG) cell by a User Equipment (UE), the apparatus comprising:
    a CSG automatic search unit configured to:
        determine whether the automatic search needs to be performed on the CSG cell,
        turn off a CSG cell automatic search function of the UE by emptying a first white list when it is determined that the automatic search does not need to be performed on the CSG cell,
        determine whether the first white list is empty when it is determined that the automatic search needs to be performed on the CSG cell, and
        turn on the CSG cell automatic search function of the UE by recovering the first white list when the first white list is empty,
    wherein the first white list includes CSG IDentifiers (IDs) of accessible CSG cells of the UE, and
    wherein the CSG automatic search unit is configured to recover the first white list by using a second white list including at least one CSG ID of at least one CSG cell to which the UE is registered.

7. The apparatus of claim 6, wherein the CSG automatic search unit is configured to use the second white list to recover the first white list by copying the at least one CSG ID included in the second white list and inserting the copied CSG ID into the first white list.

8. The apparatus of claim 6, wherein the CSG automatic search unit is configured to use the second white list to recover the first white list by copying CSG IDs of currently accessible CSG cells among the at least one CSG ID included in the second white list and inserting the copied CSG IDs into the first white list.

9. The apparatus of claim 6, wherein the CSG automatic search unit is configured to:
    determine that the automatic search does not need to be performed on the CSG cell when the UE does not support a CSG function, or when the UE supports the CSG function, when an accessible CSG cell does not exist nearby or the UE is a high speed UE, and
    determine that the automatic search needs to be performed on the CSG cell when the UE supports the CSG function and when the accessible CSG cell exists nearby or the UE is switched from the high speed UE to a low speed UE.

10. The apparatus of claim 9, wherein the CSG automatic search unit is configured to:
    determine that the accessible CSG cell exists nearby when a pre-stored fingerprint and current broadcast information have the same information, and
    determine that the accessible CSG cell does not exist nearby when the pre-stored fingerprint and the current broadcast information do not have the same information.

* * * * *